United States Patent
Yamamoto et al.

(10) Patent No.: US 7,136,677 B2
(45) Date of Patent: Nov. 14, 2006

(54) PORTABLE TERMINAL

(75) Inventors: Mitsuhiko Yamamoto, Kawasaki (JP); Misao Kikuchi, Kawasaki (JP); Ken Hayashida, Kawasaki (JP); Yoshikazu Watanabe, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 500 days.

(21) Appl. No.: 10/212,260

(22) Filed: Aug. 6, 2002

(65) Prior Publication Data
US 2003/0032458 A1 Feb. 13, 2003

(30) Foreign Application Priority Data
Aug. 8, 2001 (JP) ............................ 2001-240118

(51) Int. Cl.
*H04M 3/42* (2006.01)
(52) U.S. Cl. ................ 455/567; 455/414.4; 455/414.2; 455/412.1; 455/563; 379/88.7; 379/88.11; 379/88.12; 379/88.16; 379/88.18
(58) Field of Classification Search ............. 414/414.4, 414/414.2, 414.1, 412.1, 466, 563; 379/88.7, 379/88.11, 88.12, 88.16, 88.18, 88.03, 67.1, 379/88.1
See application file for complete search history.

(56) References Cited

U.S. PATENT DOCUMENTS

| | | | | |
|---|---|---|---|---|
| 5,751,806 | A * | 5/1998 | Ryan | 380/237 |
| 6,421,707 | B1 * | 7/2002 | Miller et al. | 709/206 |
| 6,466,653 | B1 * | 10/2002 | Hamrick et al. | 379/67.1 |
| 6,473,628 | B1 * | 10/2002 | Kuno et al. | 455/566 |
| 6,560,454 | B1 * | 5/2003 | Helle et al. | 455/412.1 |
| 6,697,617 | B1 * | 2/2004 | Liebenow | 455/425 |
| 6,718,016 | B1 * | 4/2004 | Bossemeyer et al. | 379/88.19 |
| 6,728,353 | B1 * | 4/2004 | Espejo et al. | 379/114.2 |
| 6,775,359 | B1 * | 8/2004 | Ron et al. | 379/88.14 |
| 6,848,996 | B1 * | 2/2005 | Hecht et al. | 463/35 |
| 2002/0034956 | A1 * | 3/2002 | Mekuria | 455/466 |
| 2002/0124100 | A1 * | 9/2002 | Adams | 709/232 |
| 2002/0183048 | A1 * | 12/2002 | Takeuchi | 455/414 |
| 2003/0144037 | A1 * | 7/2003 | Fraccaroli | 455/567 |
| 2004/0132407 | A1 * | 7/2004 | Hein-Magnussen et al. | 455/41.1 |

FOREIGN PATENT DOCUMENTS

| | | |
|---|---|---|
| JP | 11-102198 | 4/1999 |
| JP | 11-110107 | 4/1999 |
| JP | 2000-357077 | 12/2000 |

OTHER PUBLICATIONS

Japanese Office Action for application No. 2001-240118 (2 pgs).

* cited by examiner

*Primary Examiner*—Lester G. Kincaid
*Assistant Examiner*—Fred A. Casca
(74) *Attorney, Agent, or Firm*—Staas & Halsey LLP

(57) ABSTRACT

A portable terminal reading text, such as predetermined information sent as an electronic mail message, and/or viewable by using a browser in a convenient or user-friendly manner for a visually-impaired user. The portable terminal executes operations including, reading out a first information; reading out a second information; and selectively switching between reading out the first and second information based on information to be read out. Specifically, the DSP is configured to read out a text sentence using a downloaded read-out in voice program. The sound source LSI which possesses a built-in ADPCM (Adaptive Differential Pulse Code Modulation) function is configured to vocally output a depressed numeric key by using a registered vocabulary. The DSP functions as a voice codec during a telephone conversation using a downloaded voice codec program. Thus, the DSP of the portable terminal is a dual-function type having a read-out in voice function and a voice codec function.

2 Claims, 4 Drawing Sheets

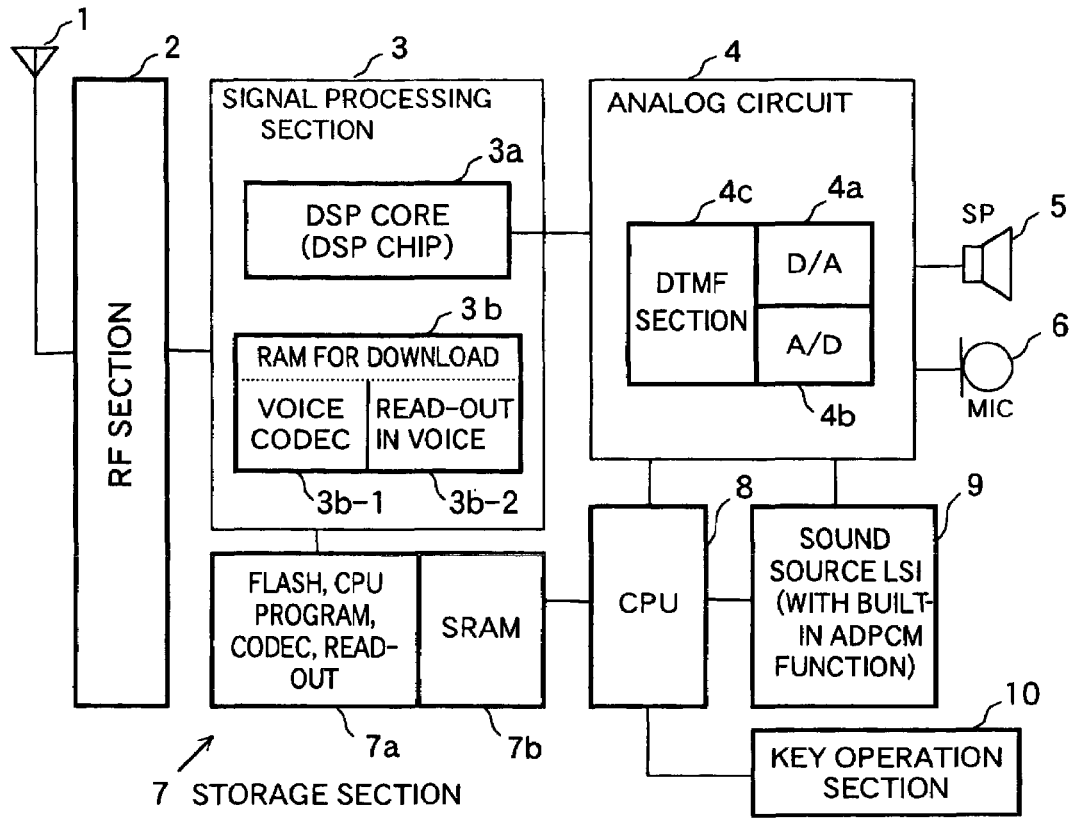

Fig. 3(a)
DIRECT OUTPUT FROM DSP
Fig. 3(b)
OUTPUT FROM SOUND SOURCE LSI
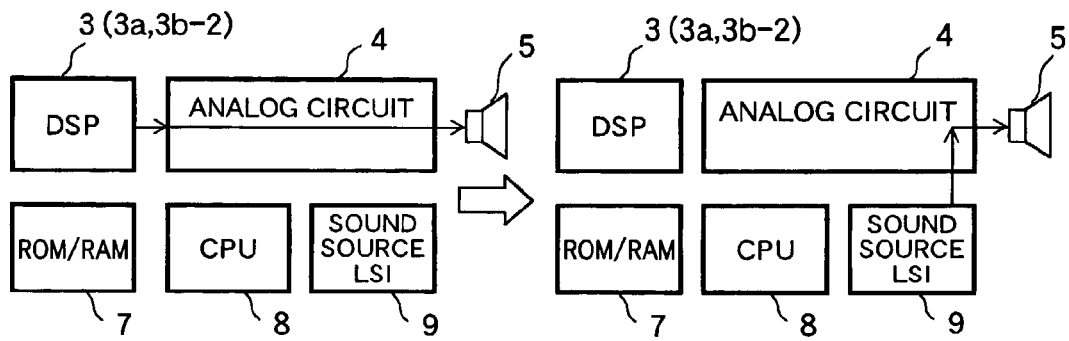
Fig. 4
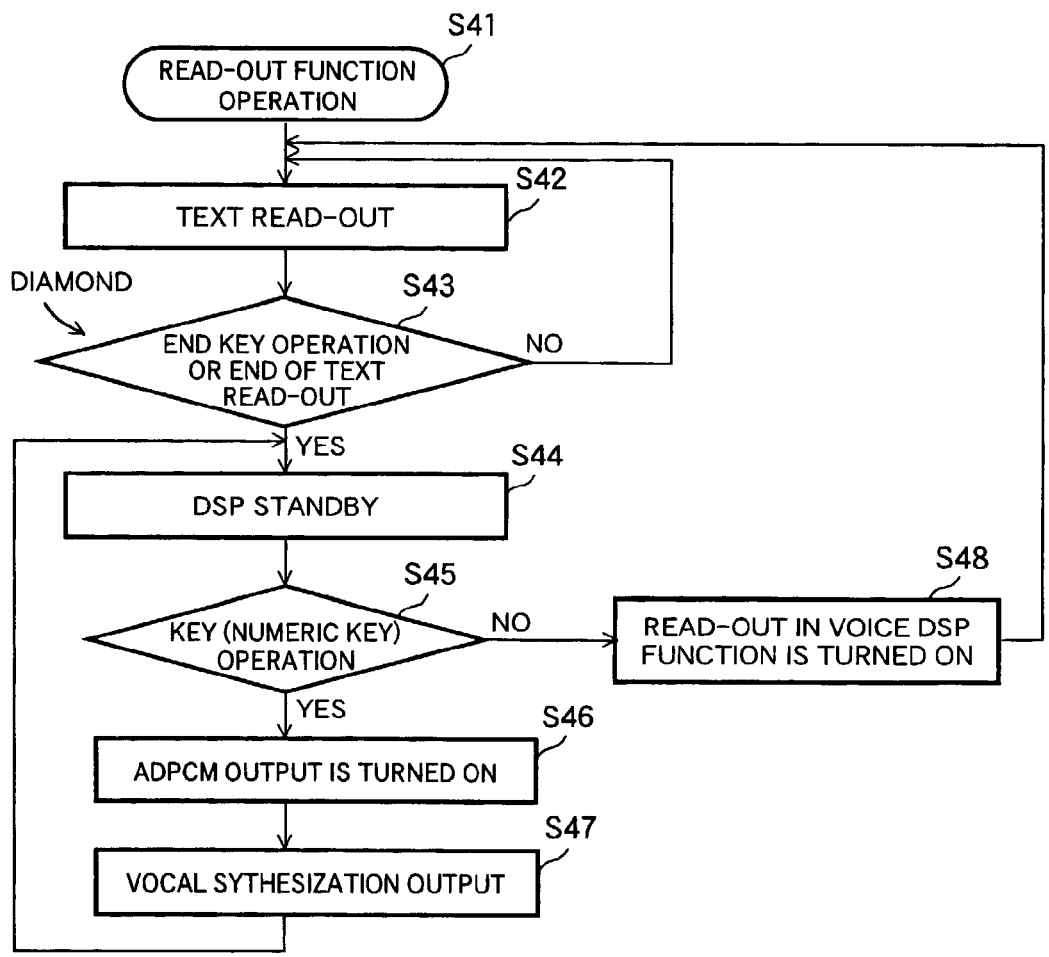

PORTABLE TERMINAL

BACKGROUND OF THE INVENTION

1. Field of the Invention

The present invention relates to a portable terminal such as a mobile telephone capable of reading out a text sent as an electronic mail message and/or viewable by using a browser.

2. Description of the Related Art

Recently, a portable terminal such as a mobile telephone and the like has rapidly been developed. Consequently, there are prevailed portable terminals of various types equipped not only with a telephone function but also with a mail-communication function and/or the Internet-connecting function become widespread.

However, a conventional portable terminal such as the mobile telephone is not equipped with a function to read out in voice a text sent as an electronic mail message and/or viewable by using browser. Therefore, they are inconvenient or not user-friendly for a visually-impaired user and/or senior user, e.g., who has weak in eyesight or cannot watch a screen of the portable terminal.

In order to solve the above-mentioned problems, an object of the present invention is to provide a portable terminal which is capable of reading out a text such as a predetermined information sent as an electronic mail message and/or viewable by using a browser and which is convenient or user-friendly for a visually-impaired user and/or senior user.

SUMMARY OF THE INVENTION

According to an aspect of the present invention, a portable terminal is characterized by comprising:

first read-out in voice means for reading out a first information;

second read-out in voice means for reading out a second information; and switching means for selectively switching said first and second read-out in voice means based on an information to be read out.

The present invention can be applied to a mobile telephone as one example of the portable terminal. In an embodiment of the mobile telephone, the first read-out in voice means is comprised of a DSP (Digital Signal Processor) and the second read-out in voice mean is comprised of a sound source LSI. The DSP picks up a voice signal from a read-out in voice dictionary data region previously equipped with by the DSP for outputting it as a vocal data (digital data). On the other hand, the sound source LSI possesses an ADPCM (Adaptive Differential Pulse Code Modulation) function by which a coded voice is decoded to output a voice, In this way, the two read-out in voice means which are different in voice processing from each other are switched from each other, thereby reducing a sense of incompatibility of each of reading-out tonalities thereof.

According to a further aspect of the present invention, the mobile telephone is characterized in that the first information includes a text sentence and the second information includes a numeric character of a depressed numeric key or a menu item. As an example, the first read-out in voice means comprises a DSP and the second read-out in voice means comprises a sound source LSI. In this case, the DSP and the sound source LSI are switched from each other such that the DSP takes charge of read-out in voice of a text sentence and the sound source LSI takes charge of read-out in voice of a depressed numeric key or a menu item. Therefore, since the sound source LSI takes charge of a vocal output of frequently used menu and numeric key, so that any time-lag from one read-out to another read-out can be reduced. In this case, the sound source LSI also possesses the ADPCM function and a storing region for registering therein a predetermined vocabulary, as a result of which the second read-out in voice means is capable of reading out said predetermined vocabulary upon a request for activating the second read-out in voice means. Therefore, a sense of incompatibility of vocal phrases can be alleviated.

According to a yet further aspect of the present invention, the first read-out in voice means is characterized in that it is used by downloading a read-out in voice program. In an embodiment of the present invention, the DSP serving as the first read-out in voice means includes voice codec means for functioning as a voice codec during a telephone conversation. This voice codec is the type to download its voice codec program. Thus, since the DSP is configured to be of a download type, it is possible to improve an efficiency of a firmware design for the DSP and reduce a cost thereof. Besides, a downloaded program as mentioned above will be stored outwardly of the DSP chip.

According to a still further aspect of the present invention, the mobile telephone further comprises battery residual capacity detector means for detecting a battery residual capacity of the mobile telephone, wherein the DSP or the sound source LSI is configured to read out the battery residual capacity detected by the battery residual capacity detector means. In particular, the DSP comprises voice changing means for changing a voice used for the read-out in voice. In an embodiment of the present invention, the mobile telephone further comprises automatic incoming response means capable of setting the mobile telephone in an automatic incoming response mode, wherein, upon receipt of a text sentence during the automatic incoming response mode of the mobile telephone, the DSP reads out the text sentence. On the other hand, the mobile telephone further comprises decision means for deciding either one of a telephone call incoming and a text sentence incoming during the automatic incoming response mode of the mobile telephone, wherein, in the case of the telephone call incoming, the DSP is forced to function as a voice codec.

These and other aspects of the present invention will be apparent from the following specific description, given by way of example, with reference to the accompanying drawings.

BRIEF DESCRIPTION OF THE DRAWINGS

FIG. 1 is a schematic block diagram illustrating a mobile telephone as a portable terminal according to an embodiment of the present invention;

FIG. 2 is a schematic representation showing various storing regions of a FLASH memory;

FIGS. 3(a) and 3(b) are schematic block diagrams showing output paths for output voices;

FIG. 4 is a flow-chart showing operations of a read-out in voice DSP and a sound source LSI;

DESCRIPTION OF PREFERRED EMBODIMENTS

Figure 5:
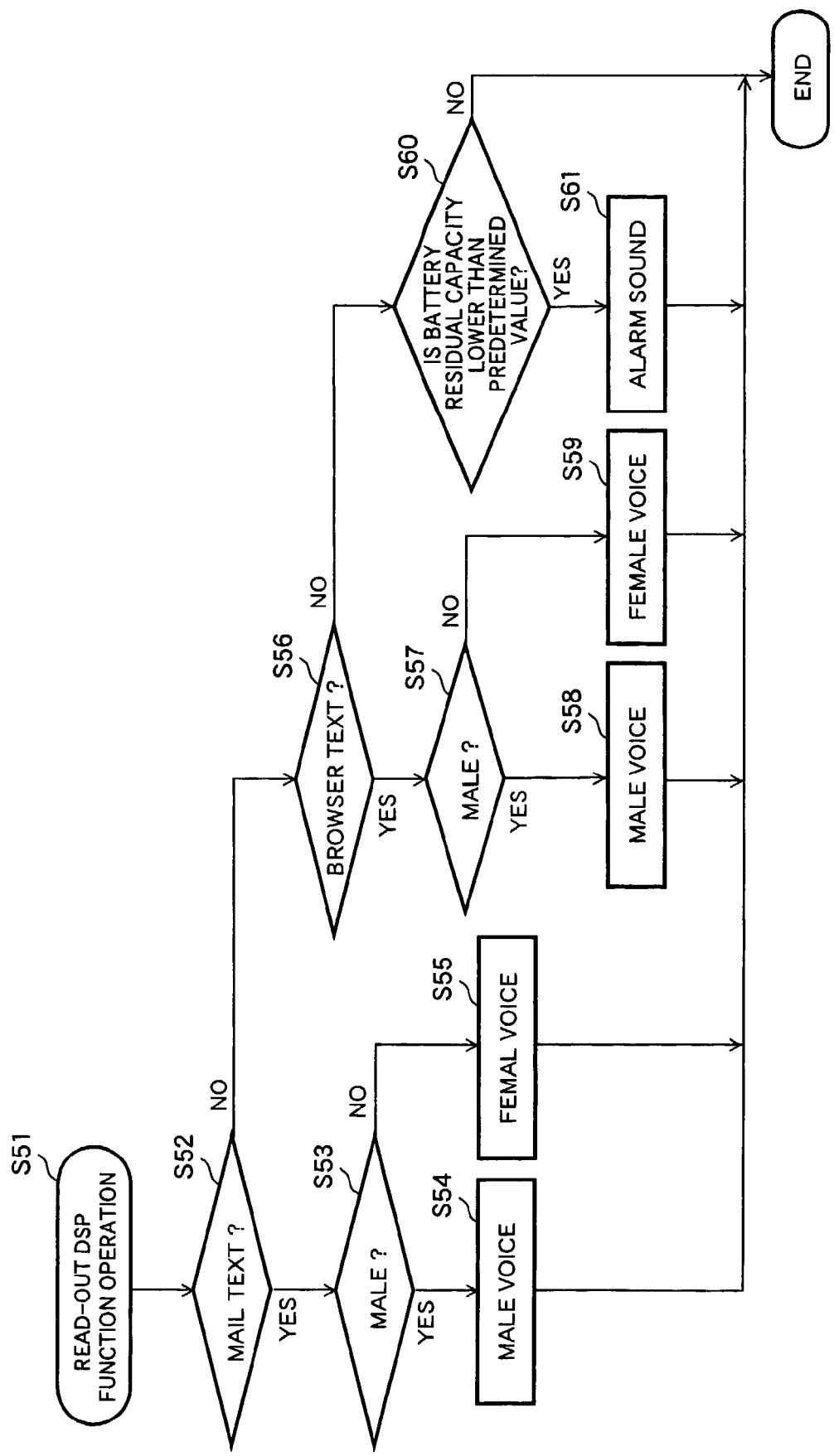
FIG. 5 is a flow-chart showing an equalizing control operation.

Hereinafter, preferred embodiments of the present invention will be described in detail with reference to the accompanying drawings.

FIG. 1 is a schematic block diagram showing a mobile telephone as a portable terminal according to an embodiment of the present invention. This mobile telephone comprises: a receiving antenna 1 for receiving an electromagnetic wave; an RF section 2 connected to the receiving antenna 1 and adapted to perform a modulation-demodulation processing by using a carrier wave signal; a signal processing section 3 connected to the RF section 2 and adapted to perform a signal processing, thereby obtaining an output voice signal and display signal of a text and the like based on a receiving signal and/or a transmitting signal from an input voice signal and a key input signal; an analog circuit 4 connected to the signal processing section 3 and adapted to convert a digital voice signal obtained from the signal processing section 3 into an analog voice signal or an analog voice signal therefrom into a digital voice signal, a speaker 5 connected to the analog circuit 4 and adapted to output a voice; a microphone 6 adapted to input a voice or sound; a storage section 7 adapted to store therein data required for various processings as mentioned above; a CPU 8 serving as a controller adapted to perform controls required for various processings as mentioned above; a sound source LSI (a voice synthesizing LSI) 9 adapted to vocally realize a required display; and a key operation section 10 adapted to perform a key-input.

The signal processing section 3 employs a download type DSP (Digital Signal Processor), for use in digital signal processing, comprising a DSP chip 3a forming a hardware thereof and a downloaded-program storing section (RAM) 3b for storing therein a control program downloaded for former DSP chip 3a. This downloaded control program includes: a voice codec program by which the DSP can perform a voice codec function during a telephone conversation; and a read-out in voice program by which the DSP can perform a read-out in voice function to read out in voice a text sentence of an electronic mail and the like during a standby state, they being stored in storing regions 3b-1 and 3b-2, respectively.

The storage section 7 includes a FLASH memory 7a and SRAM 7b. The FLASH memory 7a comprises: a DSP region 71; a CPU region 72; a DSP and CPU-shared region 73; and an other region 74. The DSP region 71 is divided into a voice codec firmware region 71a and a reading-out in voice firmware region 71b. The DSP and CPU shared region 73 stores therein various kinds of vocal data as equalizer voice wave data so as to output a mail voice, a browser voice and an alarm voice by appropriately changing a voice or sound. In these voice or sound data, there is included such a voice data as to enable a selection between a male voice and a female voice for use of a mail voice and a browser voice, for example.

Further, the CPU region 72 of the FLASH memory stores therein a CPU-controlling program and the other region 74 the FLASH memory is used as a user region for storing therein data of fixed voices, games, incoming melodies, images and telephone books.

The sound source LSI 9 possesses an ADPCM (Adaptive Differential Pulse Code Modulation) function and has registered vocabularies frequently used during a numeric-key operation on the key operation section 10 and during a processing for read-out in voice of a menu. The registered vocabulary is read out in voice to vocally output when the processing as above is executed. Specifically, the sound source LSI 9 comprises: a MIDI sound source for outputting an incoming melody and the like; an ADPCM decoder for performing the above-mentioned ADPCM function; an amplifier for amplifying an audio signal from the MIDI sound source or the ADPCM decoder; and a memory in which an audio data (including the vocabularies frequently used during the numeric-key operation and the processing for read-out in voice of the menu) used by the MIDI sound source and the ADPCM decoder is registered. Finally, the analog circuit 4 comprises: a D/A converter 4a; an AND converter 4b; and a DTMF section 4c for outputting a DTMF (Dial Tone Multi Frequency).

In the embodiment of the mobile telephone as described above, the antenna section 1 and the RF section 2 constitute a reception section and a transmission section, respectively, of the present invention. Further, the DSP chip (DSP core) 3a of the signal processing section 3, the read-out in voice program stored in the RAM 3b (hereinafter, these are co-jointly referred to as "read-out in voice DSP") and the sound source LSI 9 constitute read-out in voice means. In this embodiment, the read-out in voice DSP and the sound source LSI 9 are switched from each other, by the CPU 8, based on a kind of read-out information such that the read-out in voice DSP mainly takes charge of read-out in voice of a text sentence as shown in FIG. 3(a) and the sound source LSI 9 mainly takes charge of read-out in voice of a depressed numeric character key or a menu as shown in FIG. 3(b).

FIG. 4 is a flow-chart showing principal operations of the read-out in voice DSP and sound source LSI 9.

First, in order to read-out in voice a text sentence, an operation of a readout function is started in step 41, so that the read-out in voice DSP continues a read-out in voice operation until an end-key operation is performed or a read-out of a text sentence is completed in steps 42 and 43. If the operation of the end-key is performed or the read-out of the text sentence is completed in the case of "Yes" at step 43, then the read-out in voice DSP becomes in a standby state in step 44. Next, if any key operation is performed in step 44 and particularly it is a numeric-key operation, i.e., in the case of "Yes" in step 45, then the ADPCM of the sound source LSI 9 is turned on in step 46 so that its operated numeric-key is read out in voice by using a voice synthesization output in step 47. On the other hand, if a key operation is a function-key operation, i.e., in the case of "No" in step 45, then the read-out in voice DSP is turned on so as to be active in step 48, as a result of which this process flow returns to step 42 so as to read out in voice a text sentence. In this way, the read-out in voice DSP takes charge of read-out in voice of a text sentence and the sound source LSI 9 takes charge of read-out in voice of a numeric key so that a sense of incompatibility of each of reading-out tonalities thereof can be alleviated. Furthermore, the sound source LSI 9 is configured to read out registered predetermined vocabularies by the ADPCM function upon request of activation of the sound source LSI 9 so that a sense of incompatibility of vocal phrases can be alleviated.

It would be appreciated that the read-out in voice DSP functions as a voice codec DSP, during a telephone conversation, by using the voice codec program stored in the RAM 3b. Also, in accordance with the present invention, the read-out in voice DSP is able to vocally output a battery residual capacity value detected by a battery residual capacity detector which is normally equipped with by a conventional mobile telephone. In this case, it may be possible to vocally output such a detected value automatically only when the battery residual capacity is lower than a predetermined value as an example. Further, it may be possible to substitute such a vocal output with an alarm sound (or alarm voice) stored as an equalizer sound wave data stored in the DSP and CPU-shared region 73, thereby prompting a user to recharge a battery of his/her mobile telephone. Such a sound substitution or sound change can be performed when a text sentence sent as an electronic mail message or viewable by using a browser is read out by appropriately selecting and using respective dedicated sounds from the equalizer sound wave data.

FIG. 5 is a flow-chart showing an operation of an equalizing control as above. If there is an instruction for requesting a read-out in voice of a text by a function of the read-out in voice DSP in step 51 and particularly such a text is an electronic mail message, i.e., in the case of "Yes" in step 52, then either one of a male voice and a female voice which voices are previously preset is selected to perform a read-out in voice in steps 53 to 54 or steps 53 to 55. Also, it is preferable that the male or female voice is automatically selected depending on the gender of a mail transmitter previously registered so as to perform the read-out in voice. Similarly, upon a read-out of a text viewable by using a browser, such a read-out in voice is performed after the male or female voice is selected in steps 56 to 58 or steps 56 to 59. Furthermore, in case of a notification of the battery residual capacity, the alarm sound is read out when the battery residual capacity is lower than a predetermined value, as exemplified above, in steps 60 and 61. Also, the read-out of the alarm sound can be substituted by reading and phonating one of vocabularies registered in the memory of the sound source LSI 9.

Preferably, the mobile telephone according to this embodiment of the present invention further comprises an automatic incoming response means by which the mobile telephone can be set in an automatic incoming response mode. When a text sentence sent as an electronic mail message is received by the mobile telephone set in the automatic incoming response mode, the read-out in voice DSP will read out the mail text sentence, thereby saving one trouble in reading out the mail text sentence actually by a user. On the other hand, upon receipt of an incoming call the voice codec DSP is activated such that a normal telephone conversation is conducted through the mobile telephone. In detail, the read-out in voice DSP and the voice codec DSP are automatically switched from each other depending on either one of the mail incoming and telephone call incoming.

Figure 6:
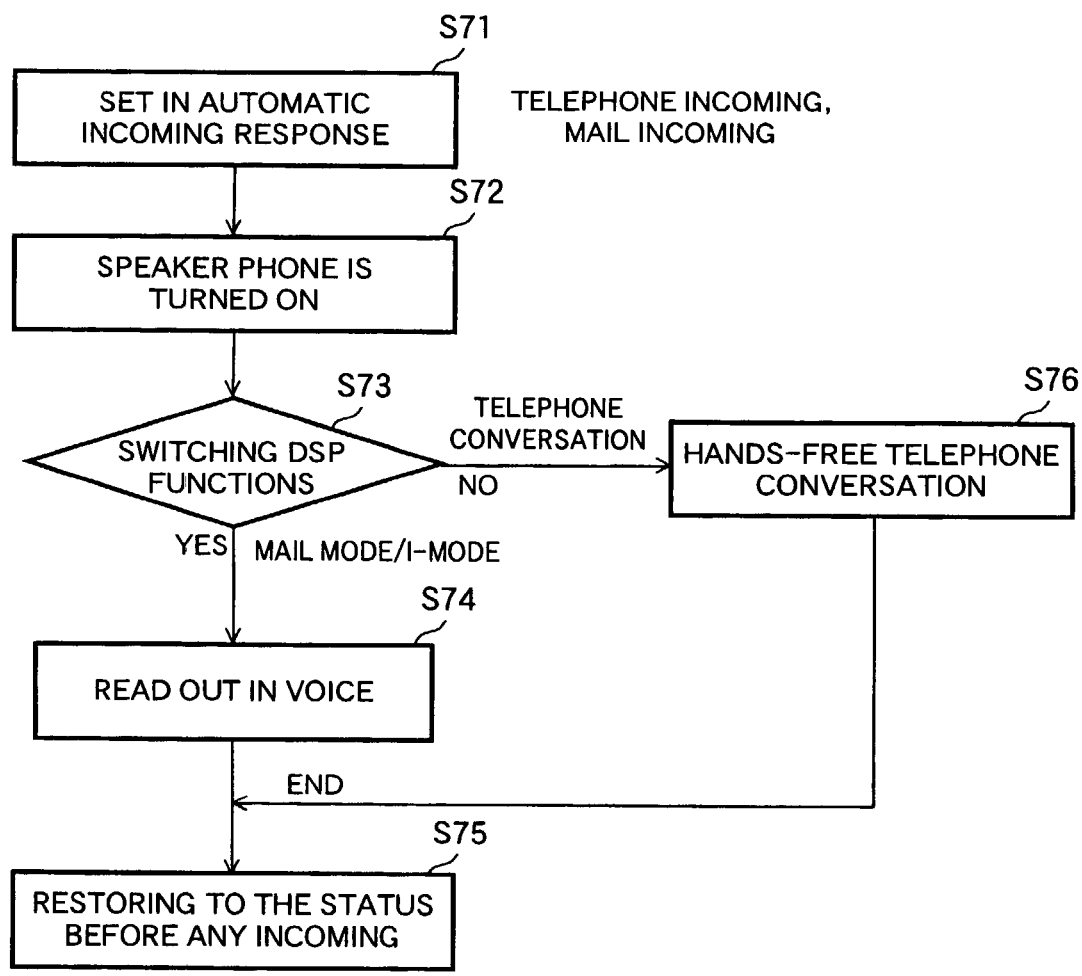
FIG. 6 is a flow-chart showing an operation of the mobile telephone in the automatic incoming mode upon occurrence of an incoming.

FIG. 6 is a flow-chart showing an operation of the mobile telephone set in the automatic incoming mode upon occurrence of an incoming. After the automatic incoming mode is set in step 71, a speaker phone is turned on in step 72. If the mail incoming is occurred, i.e., in the case of "Yes" in step 73, then the DSP is forced to function as the read-out in voice DSP to vocally output a mail text to read out it in step 74, thereafter restoring the process flow to the status before occurrence of any incoming in step 75. If the telephone call incoming is occurred, i.e., in the case of "No" in step 73, then the DSP is forced to function as the voice codec DSP to enable a hands-free telephone conversation in step 76, thereafter restoring the process flow to the status before occurrence of any incoming in step 75. Additionally, it may be possible to vocally notify a user of an occurrence of the mail or telephone call incoming in advance.

As described above, the mobile telephone according to the embodiment of the present invention is illustrated by way of example, but the present invention is not intended to be limited to the mobile telephone. Needless to say, the present invention can be applied to a PDA or the like and various portable terminals having receiving and/or transmitting functions.

Thus, in accordance with the present invention, it is possible to advantageously provide a portable terminal which is capable of reading out in voice a text such as a predetermined information sent as an electronic mail message and/or viewable by using a browser and which is convenient or user-friendly for a visually-impaired user and/or senior, e.g., who has weak in eyesight or cannot watch a screen of the portable terminal.

While embodiments of the invention have been illustrated and described, it is not intended that these embodiments illustrate and describe all possible forms of the invention. Rather, the words used in the specification are words of description rather than limitation, and it is understood that various changes may be made without departing from the spirit and scope of the invention.

What is claimed is:

1. A portable terminal device, comprising:
   a first read-out in voice unit reading out a first information, the first information including data viewable by a browser;
   a second read-out in voice unit reading out a second information related to the portable terminal device; and
   a switching unit selectively switching said first and second read-out in voice units based on information to be read out and providing the first and second information via the portable terminal device, and
   wherein said first information includes a text sentence and said second information includes a numeric character of a depressed numeric key or a menu item.

2. A method of providing information via a portable terminal, comprising:
   detecting a type of information to be provided as voice data; and
   automatically switching between providing information that is viewable via a browser as the voice data using a first unit and providing a numeric character of a depressed numeric key of the portable terminal as the voice data using a second unit in accordance with the detected type of information received.

* * * * *

UNITED STATES PATENT AND TRADEMARK OFFICE
CERTIFICATE OF CORRECTION

| | |
|---|---|
| PATENT NO. | : 7,136,677 B2 |
| APPLICATION NO. | : 10/212260 |
| DATED | : November 14, 2006 |
| INVENTOR(S) | : Mitsuhiko Yamamoto et al. |

Page 1 of 1

It is certified that error appears in the above-identified patent and that said Letters Patent is hereby corrected as shown below:

Title Pg, Item (54) Title: change "PORTABLE TERMINAL" to --A PORTABLE TERMINAL SELECTIVELY PROVIDING RECEIVED INFORMATION AND METHOD THEREOF--.

Column 1, Line 1, change "PORTABLE TERMINAL" to --A PORTABLE TERMINAL SELECTIVELY PROVIDING RECEIVED INFORMATION AND METHOD THEREOF--.

Signed and Sealed this

Thirteenth Day of March, 2007

JON W. DUDAS
*Director of the United States Patent and Trademark Office*